United States Patent

Smallwood

(10) Patent No.: US 8,255,263 B2
(45) Date of Patent: Aug. 28, 2012

(54) BAYESIAN PRODUCT RECOMMENDATION ENGINE

(75) Inventor: Richard D. Smallwood, Palo Alto, CA (US)

(73) Assignee: General Motors LLC, Detroit, MI (US)

( * ) Notice: Subject to any disclaimer, the term of this patent is extended or adjusted under 35 U.S.C. 154(b) by 3465 days.

(21) Appl. No.: 10/252,254

(22) Filed: Sep. 23, 2002

(65) Prior Publication Data

US 2004/0059626 A1 Mar. 25, 2004

(51) Int. Cl.
*G06Q 10/00* (2012.01)
*G06Q 30/00* (2012.01)

(52) U.S. Cl. ...................................................... 705/7.29
(58) Field of Classification Search ................ 705/10, 705/7.29

See application file for complete search history.

(56) References Cited

U.S. PATENT DOCUMENTS

| | | | | |
|---|---|---|---|---|
| 5,749,081 A * | 5/1998 | Whiteis | ...................... | 707/102 |
| 5,790,426 A * | 8/1998 | Robinson | .................... | 702/179 |
| 6,006,218 A * | 12/1999 | Breese et al. | ...................... | 707/3 |
| 6,041,311 A * | 3/2000 | Chislenko et al. | .............. | 705/27 |
| 6,249,785 B1 * | 6/2001 | Paepke | .............................. | 707/5 |
| 6,266,649 B1 * | 7/2001 | Linden et al. | ..................... | 705/26 |
| 6,356,879 B2 * | 3/2002 | Aggarwal et al. | ............... | 705/26 |
| 6,615,208 B1 * | 9/2003 | Behrens et al. | ................... | 707/5 |
| 6,831,663 B2 * | 12/2004 | Chickering et al. | .......... | 715/700 |
| 7,461,058 B1 * | 12/2008 | Rauser et al. | ..................... | 707/5 |
| 2002/0055890 A1 * | 5/2002 | Foley | .............................. | 705/27 |
| 2002/0147628 A1 * | 10/2002 | Specter et al. | .................. | 705/10 |

OTHER PUBLICATIONS

Frey, Brendan J.; Graphical Models for Maching Learning Communication, The MIT Press, 1998.*
Gopinath, R.A.; "Maximum Liklihood Modeling with Gaussian Distributions for Classification", Proc. ICASSP, 1998.*

* cited by examiner

*Primary Examiner* — Peter Choi

(57) ABSTRACT

The invention provides a method of generating a recommendation for a product type. A plurality of product attributes associated with the product type is provided. A sampled set of consumer values is received. At least one user preference corresponding to the product attributes is received. A plurality of consumer values based on the at least one user preference and the sample set of consumer values is calculated, and at least one product recommendation is determined based on the calculated consumer values.

14 Claims, 4 Drawing Sheets

BAYESIAN PRODUCT RECOMMENDATION ENGINE

FIELD OF THE INVENTION

This invention relates generally to web applications employing real-time user interaction. In particular, the invention relates to a method for determining a product recommendation using statistical methods and a web interface.

BACKGROUND OF THE INVENTION

Automated methods to generate product recommendations for a product type such as cars and trucks are typically non-user friendly, ineffective, and uncomfortable to use. Various approaches to generating recommendations have been proposed, though each suffers from various deficiencies.

Filtering systems, for example, ask for allowable ranges of product attributes and then show the list of products that have all their attributes within the ranges specified. In many cases, the system recommends either too many or too few (often zero) product recommendations. Products within the limits of the ranges are not listed in order of desirability. The systems exhibit no intrinsic knowledge of consumer values and as a result, obvious connections between attributes are ignored and effective recommendations based on a user's preferences are not given.

In rule-based systems, elaborate and complex rules are set up for translating user statements about desirable features of a product into a list of recommended products for the consumer. These systems are referred to by such names such as fuzzy logic, artificial intelligence, expert systems and neural nets. In some cases, scoring systems are used. In other cases, experts are asked to define the rules. Since these systems do not try to model the underlying values of consumers for product attributes, the data is not very useful for helping manufacturers design new products. The lack of a systematic logic for connecting user data to product recommendations requires that a new system must be constructed for each new product area, which makes them expensive to construct.

Conjoint measurement systems commonly ask a series of trade-off questions, typically eight to twelve of them, along with a few other types of questions. Standard conjoint measurement algorithms are used to calculate estimates of user values and then the estimated values are used to calculate recommendations. Many users dislike tradeoff questions and when they do, they are likely to abandon the interview. The interview of conjoint measurements systems may be excessively long, and typically cannot be interrupted to get intermediate recommendations. Users cannot go back and change answers and check the effect of those changes on the recommendations.

On-line interviews, like conjoint measurement systems, can use trade-off questions to find out what product features customers want. Many people are uncomfortable with and even antagonistic to this interview approach of tradeoff questions, and any interview that makes an interviewee uncomfortable, will probably be unsuccessful. Instead, the questions and recommendation methodology of any interview process should be well aligned with an intuitive notion of what a good recommendation should be. A better interview approach poses more user-friendly questions, for example, "What is important to you when you buy a vehicle?", with easy-to-use, interactive answer selection styles using selectors such as radio buttons, checkboxes, sliders, icons, dialog boxes, numerical input and other graphical user interface techniques.

One objective of this invention is to provide a web-based application that generates product recommendations based on answers to questions and user-selected preferences from which inferences and recommendations can be made. Consumers who use the website should be able to answer a few questions about their preferences for a product, after which the website provides them a list of recommended products, ranked in order of the estimated value of the product to the user. The questions should be understandable and easy to answer. Moreover, users should be allowed to decide which questions to answer and when they want to see the list of recommended products. Users should be able to go back and change answers to previously answered questions or to answer additional questions in a continuing dialog with the website. The data from the users may be stored and used to estimate the aggregate response of classes of users in a wide variety of future market scenarios.

Another objective of this invention is to provide consumers with highquality and unbiased recommendations about the products of a particular market, which are consistent with their preferences for specific product attributes. Another objective of the invention is to collect consumer preference data using the recommendation engine. The collected preference data can guide product manufacturers in design and improvements of their products, making them more responsive to the diversity of consumer needs and preferences.

Consumers should have a more flexible and user-friendly interface for recording their product preferences, an interface that uses questions that are easy to understand, avoids rigid interview schedules, allows modifications to earlier answers or answers to new questions, and allows the user to observe how changed or new answers affect the set of recommended products. Another objective of this invention is to offer consumers an easier way to find products that best meet individual consumer needs and preferences for products, thereby increasing their satisfaction and the efficiency of the free market.

It is an object of this invention, therefore, to provide a method and a system to generate a product recommendation for a product type, and to overcome the challenges and deficiencies described above.

SUMMARY OF THE INVENTION

One aspect of the invention provides a method and a system for generating a product recommendation for a product type. A plurality of product attributes associated with the product type is provided. A sampled set of consumer values associated with the product attributes is received. At least one user preference corresponding to the product attributes is received. A plurality of consumer values based on the at least one user preference and the sampled set of consumer values is calculated, and at least one product recommendation is determined based on the calculated consumer values.

The plurality of product attributes may include at least one attribute level associated with each product attribute. The sampled set of consumer values may include a set of measured product attribute values from a set of consumers.

The plurality of consumer values may be calculated by determining a likelihood function based on the user preferences, calculating an initial Gaussian probability density function (Gpdf) based on the sampled set of consumer values, calculating a posterior Gpdf based on the likelihood function and the initial Gpdf, and calculating a plurality of consumer values based on the posterior Gpdf. A linear form and an additive Gaussian noise function may characterize the likelihood function with a variance based on the sampled set of consumer values. A mean vector and a precision matrix may characterize the posterior Gpdf.

A product recommendation may be determined by computing a total value for each of a set of products in a product definition database, sorting the total values to produce an ordered list of total values, and associating the products in the product definition database with the ordered list of total values.

The product recommendation may be displayed based on the calculated consumer values. Alternatively, a product recommendation request may be received and at least one product recommendation displayed based on the product recommendation request and the calculated consumer values.

A product type market study may be generated based on the plurality of calculated consumer values.

Another aspect of the invention includes a computer usable medium containing a program for generating a product recommendation for a product type.

The aforementioned, and other features and advantages of the invention will become further apparent from the following detailed description of the presently preferred embodiments, read in conjunction with the accompanying drawings.

BRIEF DESCRIPTION OF THE DRAWINGS

The present invention is illustrated by the accompanying drawings of various embodiments and the detailed description given below. The drawings should not be taken to limit the invention to the specific embodiments, but are for explanation and understanding. The detailed description and drawings are merely illustrative of the invention rather than limiting, the scope of the invention being defined by the appended claims and equivalents thereof. The foregoing aspects and other attendant advantages of the present invention will become more readily appreciated by the detailed description taken in conjunction with the accompanying drawings, wherein:

DETAILED DESCRIPTION OF THE PRESENTLY PREFERRED EMBODIMENTS

The present invention is a method or recommendation engine for generating a product recommendation for a product type. The recommendation engine utilizes a database of measured consumer values, a product-definition database, and responses to a few well-posed questions from a user interacting with the recommendation engine. The recommendation engine may be implemented as a web application, with the user providing indications of preferences regarding the product type by using a browser on his/her personal computer (PC), or on a networked device such as a personal digital assistant (PDA). Recommendations generated by the recommendation engine may be displayed with photos and detailed information at the computer terminal, and then the user may provide additional preferences or change previous answers as the recommendation engine re-calculates and updates an ordered list of recommendations from data in the product definition database. Bayesian statistics and other statistical models are incorporated into the method to infer relative values that a consumer places on the levels of attributes and features available with each model. The inferences and generated list of ordered recommendations are based on a previously measured set of consumer values for the models also having various features and options.

The invention uses the principals of Bayesian inference adapted to the situation of user-friendly questions. The questions are structured using linear forms for the likelihood function. Answers to a broad range of questions are translated by a new body of concepts into linear forms that are compatible with the Bayesian approach.

The invention uses mathematical concepts from probability, Bayesian statistics, and economics to determine good recommendations with minimum user input.

Products may be represented by product attributes that would be of interest to consumers. For example, when the product type is a mobile vehicle, its attributes could include fuel economy, acceleration capability, body type and size, make (brand), roominess, features, and price. Each attribute may be characterized by two or more levels, which serve to represent the range of possible settings of the attribute. For example, the levels of fuel economy might be 15 mpg, 25 mpg and 35 mpg, and the levels of make might typically encompass all brand names of vehicles available on the market such as Chevrolet, Dodge, Lexus and BMW. An attribute can be numerical (e.g., fuel economy or price) or categorical (e.g., make, body type or features). In the case of mobile vehicles, features may include attributes such as separate driver and passenger temperature controls, voice-activated radio and climate controls, power front seats, CD player, or sunroof and moon roof.

With the present invention, a user can rapidly and enjoyably obtain a set of product recommendations from his or her preferences via a user-friendly, attractive website. The invention is applicable to a variety of consumer goods and services, including any product or service whose value can be represented to a consumer as a bundle of attributes. The product type may include mobile vehicles. Alternatively, the product type may include digital cameras, personal computers, personal digital assistants, computer printers, cell phones, televisions, cameras, entertainment systems, power tools, MP3/CD players, DVD players, consumer electronic products, consumer appliances, consumer goods, consumer services, office equipment, business software, credit cards, home mortgages, car loans, health insurance, restaurants, telephone services, hotel rooms, airplane tickets, vacation packages, a consumer-valued product, or a consumer-valued service.

Figure 1:
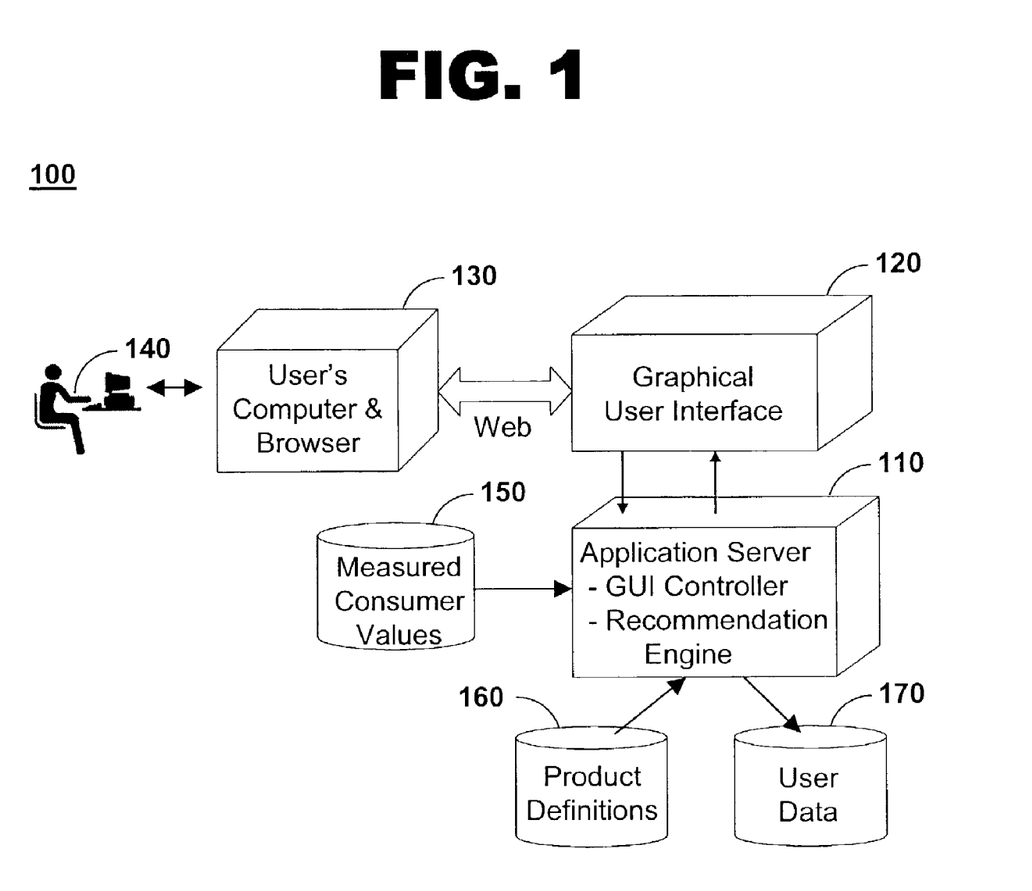
FIG. 1 is a schematic diagram of one embodiment of a system for generating a product recommendation for a product type, in accordance with the current invention.

FIG. 1 illustrates one embodiment of a system for generating a product recommendation for a product type, in accordance with the present invention at 100. Product recommendation engine 100 includes an application server 110, one or more graphical user interfaces 120, one or more user computers 130, and at least one product recommendation engine user 140. Product recommendation engine 100 also includes a measured consumer values database 150, a product definition database 160, and a user database 170.

The Bayesian product recommendation engine 100 may be incorporated into a web-based product recommendation application. A user may use the browser on his/her personal computer to access a website where the application is running. After selecting the product recommendation application for a particular product type, the user may be offered a choice of a series of questions or product preference indicators.

Upon choosing one of the questions or preference indicators, the graphical user interface (GUI) associated with the website may ask a question and the user may respond with an answer. After answering one or more questions, the user may ask to see a set of recommended products. The GUI sends a message to the server, which then begins the calculation of the recommended products. The recommendation calculation uses two databases, the product-definition database and a measured consumer-values database 150. A set of recommendation engine parameters is generated from measured consumer-values database 150. The data from each user session may be stored in the user database for later reference and for tracking a particular user's preferences. The data from the user database may also be used to fulfill market analysis objectives of the application, providing a summary of products that have been recommended and of data associated with underlying consumer values for each of the products and product attributes.

Application server 110 may be any suitable hardware and software for running software application programs and communicating with networked computers. Application server 110 may contain a program for generating product recommendations, and software for graphical user interface 120.

Graphical user interface 120 includes suitable hardware and software for generating various screens provided to user 140, and for receiving inputs and preferences from user 140. The screens may include photos, figures, text, and dialog boxes for interfacing graphically with the user. Commands may be received from application server 110 to control the generation and presentation of the various screens to user 140. Graphical user interface 120 may provide responses and requests to the application server from user 140. Graphical user interface 120 may include networking software to communicate with user 140 over a wired or wireless network to user computer 130.

User computer 130 may contain suitable hardware and software for receiving information from the application server and for responding back to the server with input such as answers to questions, preference indications, and requests. For example, user computer 130 may run a browser capable of receiving code such as hypertext markup language (HTML), extensible markup language (XML), Java, Javascript or active server pages (ASP), and displaying the desired information to user 140. User computer 130 may receive input from user 140 through keyboard entries, mouse selections, or input from other suitable input devices, and may communicate the responses to application server 110.

User 140 may be any individual or group of individuals wishing to use the system to generate product recommendations. User 140 may select, for example, a group of questions regarding a particular product type. In response to the selection, application server 110 may provide particular questions to user 140. Answers to the questions or preferences may be selected by the user and provided to application server 110. User 140 may request recommendations through an input device, and receive recommendations at user computer 130 from application server 110.

Product recommendation engine 100 may include several databases for generating product recommendations. One of the databases is a measured consumer-values database 150. Measured consumer-values database 150 contains responses from a set of consumers that have previously evaluated a particular set of product attributes for a specific product type. Attributes may be shown to respondents during fieldwork evaluations. Often enumerated in a currency such as dollars, the sampled set of consumer values contains a value that each respondent placed on one or more aspects of the product type. The sampled set of consumer values may be used to generate statistical information regarding the value of a particular product, product feature, or product option.

Product information may be stored in product-definition database 160. Product-definition database 160 may contain information such as a brand name or make, a model number, features and attribute levels for the model, and options available to a particular model. Pricing information and availability of the features and options may also be included in the database.

As product recommendations are generated and as multiple users access the system, data on user preferences and product recommendations may be stored in user database 170. Information in user database 170 may be accessed by application server 110 to assist in the generation of recommendations, and to provide relevant information for a market study based on input received by the recommendation engine from multiple users. User data may include information such as most-often recommended product, product rankings, calculated consumer values for each attribute of a product type, average consumer values, statistical quantities, and attribute importance based on frequency of attribute selection.

Figure 2:
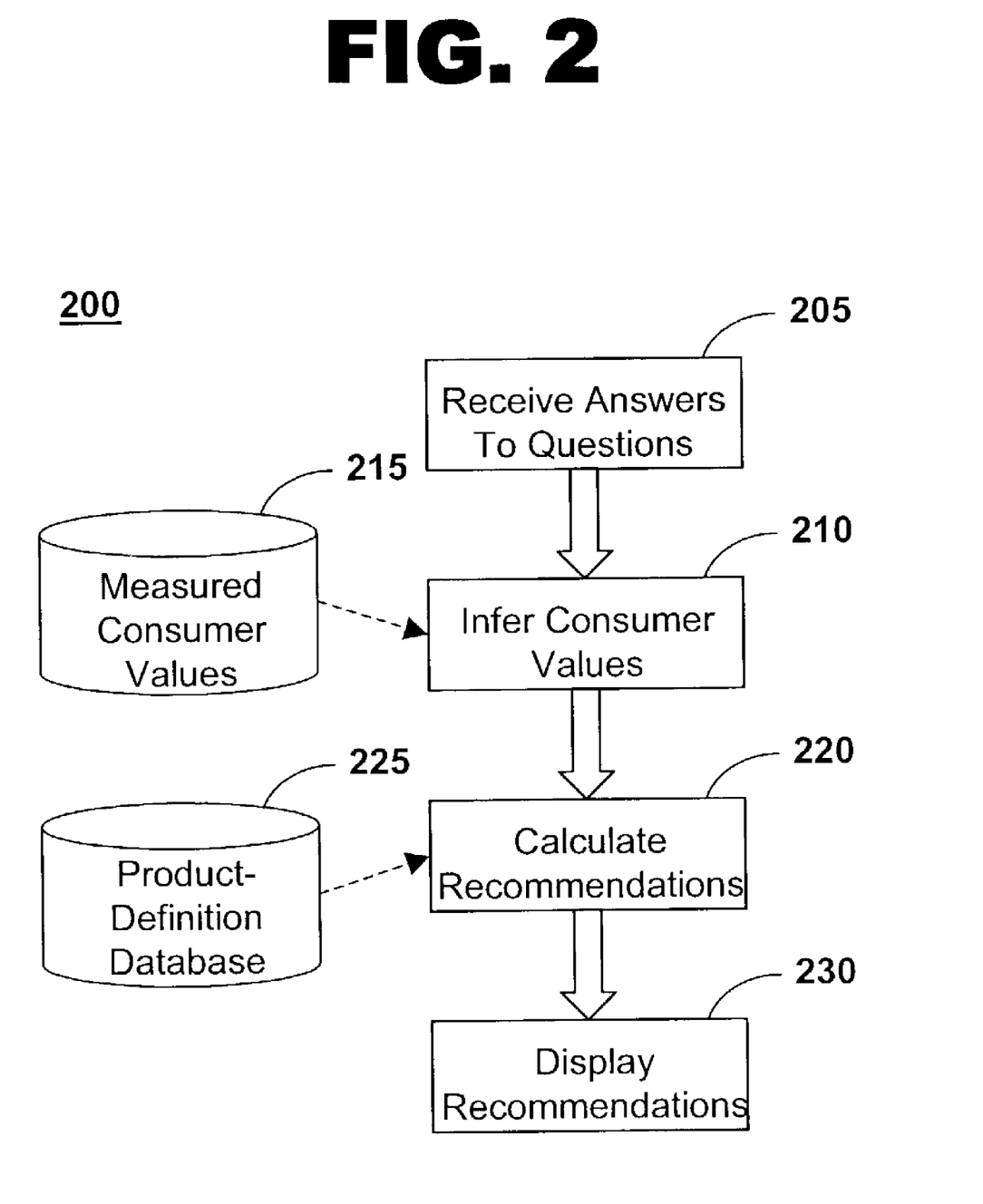
FIG. 2 is a flow chart of one embodiment of a method for generating a product recommendation, in accordance with the current invention.

FIG. 2 illustrates a flow chart of one embodiment of a method for generating a product recommendation, in accordance with the present invention at 200. Product recommendation method 200 uses Bayesian concepts to characterize the uncertainty about the user's values for the attributes. In particular, a multivariate Gaussian probability density function (Gpdf) may be used to represent the uncertainty about the user's values for each of the possible levels of all the attributes. For numerical attributes, a set of specific levels, such as 15 mpg, 25 mpg, 35 mpg and 45 mpg for fuel economy, may be used to characterize the range of possible levels. Once the user's values for these specific levels are known, linear interpolation may be used to produce estimates of the value at all other levels.

Values for an attribute may be in one of several dimensions; a common metric for attribute values is willingness-to-pay (WTP) over some base level of the attribute. For example, the value for any level of fuel economy could be represented as the user's WTP for that level over a base level of, for example, 15 mpg. Each user's values for attributes associated with the product type determine his/her value for individual products.

When the user's WTPs are known precisely, a determination may be made on which available products are the best recommendations. However, there is generally a great deal of uncertainty about the user's WTPs, and this uncertainty may be represented as a probability density function over all the WTPs. The Gpdf may be used to characterize the uncertainty about the user's WTPs and may change as additional information is collected from the respondent about preferences for a product type and its attributes. The Gpdf may be completely specified by a mean vector m of the WTPs, and a covariance matrix C of the WTPs.

The web-based application offers the user a number of possible questions whose answers will provide information about the underlying values that the user has for the product attributes. The answer to each question lessens the uncertainty about the user's values. The invention provides a simple yet comprehensive method for systematically updating the Gpdf for any set of questions answered by the user. Answers to the questions may be taken one at a time, as seen at block 205. Each serving action takes the response by the user to the last screen and updates a state variable while determining and preparing the next screen for the user. The answers to the questions may be used along with parameters to update the Gpdf representing the uncertainty about the user's values, as seen at block 210. The parameters may be derived from the database of measured consumer values, as seen at block 215.

The analysis component of the method may be represented as a step-by-step updating process in which each piece of data from the user may be used to calculate a new Gpdf over the WTPs. The updating process may be based on the principles of Bayesian inference, which follow directly from the axioms of probability. Suppose that prior to asking a question of the user, a Gpdf has some known m and C parameters. After asking the question and receiving an answer, the level of uncertainty about the user's WTPs will change and the new Gpdf may be determined according to Bayes' rule:

$$F(W|D) = Z\, G(W) L(D|W) \qquad (1)$$

where W is the vector of the user's WTPs, which are unknown; G(W) is the prior Gpdf for the user's WTPs; D is the observed data, i.e., the user's answer to the question; L(D|W) is a likelihood function for the observed data given knowledge of the user's WTPs; Z is a normalizing constant, i.e., the inverse of the summation of G(W)L(D|W) over all values of W; and F(W|D) is the desired new probability density function, referred to as the posterior distribution that describes the new state of information after observing the data, D. Under certain conditions, the posterior distribution F(W|D) is also Gaussian so that the updating process may be reduced to calculating a new mean vector and covariance matrix of the user's WTPs.

The key question then is the form of the likelihood function that should be used in the Bayesian updating process. If the likelihood function is represented as a linear form in the unknown attribute values plus Gaussian noise, then the final or posterior Gpdf is also Gaussian. Furthermore, the updating process reduces to simple matrix addition for each question. Specifically, if the Gpdf is characterized by a precision matrix (inverse of the covariance matrix) and a mean vector, then the precision matrix of the final Gpdf, also referred to as the posterior Gpdf, is simply the sum of the precision matrix of likelihood functions associated with the questions plus the precision matrix of the prior Gpdf.

The final or posterior probability density function, F(W|D), may be calculated, where D now represents all the data available from the user. To do this, it may be observed that if the prior density function, G(W), and the likelihood function, L(D|W), in Eq. 1 are both Gaussian in the WTP vector W, then the posterior density function, F(W|D), in Eq. 1 is also a Gpdf. Moreover, the mean vector and the covariance matrix of the posterior can be calculated according to:

$$C_{posterior}^{-1} = C_{prior}^{-1} + C_{likelihood}^{-1} \qquad (2a)$$

$$m_{posterior} = C_{posterior}[C_{prior}^{-1} m_{prior} + C_{likelihood}^{-1} m_{likelihood}] \qquad (2b)$$

Equation 2 can be simplified by defining a precision matrix H as the inverse of the covariance matrix. Thus, $H=C^{-1}$ and Eq. 2 becomes:

$$H_{posterior} = H_{prior} + H_{likelihood} \qquad (3a)$$

$$m_{posterior} = H_{posterior}^{-1}[H_{prior} m_{prior} + H_{likelihood} m_{likelihood}] \qquad (3b)$$

If the data consists of several question-answer sequences, each question-answer sequence can be treated as a separate datum so that Eq. 3 has additional terms added, one for each question-answer sequence.

$$H_{posterior} = H_{prior} + \sum_q H_{q-likelihood} \qquad (4a)$$

$$m_{posterior} = H_{posterior}^{-1}\left[H_{prior} m_{prior} + \sum_q H_{q-likelihood} m_{q-likelihood}\right] \qquad (4b)$$

Equation 4 is one of the primary equations used for the analysis process. Notice that only one matrix inversion is required for each update of the posterior distribution as long as the precision matrix and mean vector are known for each question-answer sequence. The precision matrix and mean vector for each type of question may be determined.

Occasionally, the user may indicate that he/she wishes to see an updated list of recommendations. A request from the user triggers a recommendation calculation by the recommendation engine to analyze the current data and to calculate recommendations. A final estimate of the user's values for the attribute levels may be generated and used to determine the best set of products for the user, ranked in order of their total value to the user, as seen at block 220. The generated recommendations may use information contained in the product definition database, including photographs, images and text, as seen at block 225. The recommendations may be displayed on the user's terminal, as seen at block 230.

Figure 3:
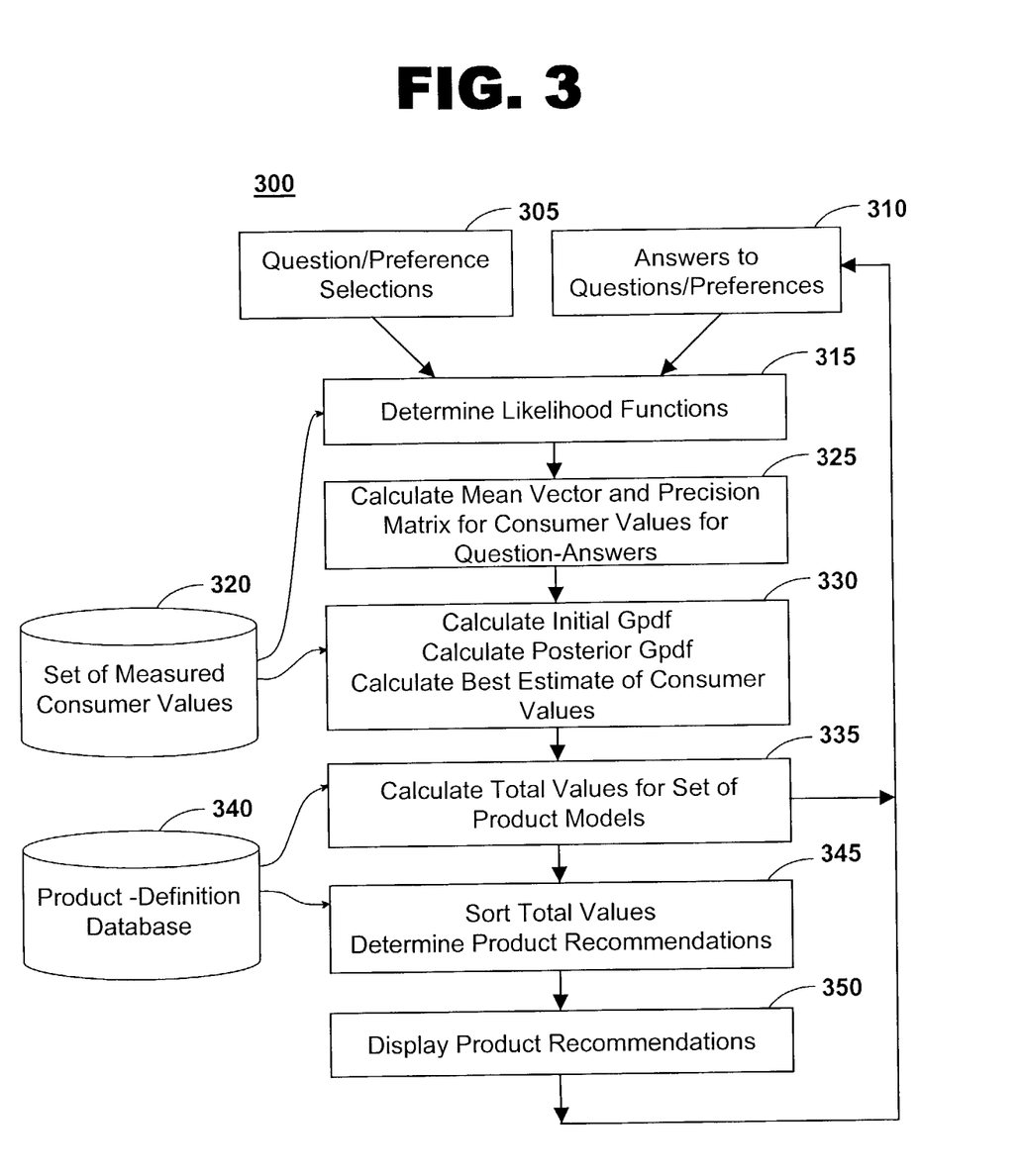
FIG. 3 is a flow chart of another embodiment of a method for generating a product recommendation in accordance with the current invention.

FIG. 3 illustrates another embodiment of a method for generating a product recommendation, in accordance with the current invention at 300. Product-recommendation method 300 comprises steps to generate a product recommendation based on a series of questions and answers regarding attributes of a particular product type. Question and preference choices are presented to a user, as seen at block 305. The user may choose to respond to one or more of the questions or preferences that he/she likes, as seen at block 310.

Each question and its associated answer are considered, and depending on the form of the question, a likelihood function is determined, as seen at block 315. The likelihood function may be characterized as a linear form plus an additive Gaussian noise function with a variance based on sampled set of measured consumer values, as seen at block 320. Many different question types are possible and each will have a different form for the likelihood function. Some of the attributes may have the characteristic that a user should prefer the quantity of more to the quantity of less. For example, a frequency of repairs question or a quality of workmanship question will have naturally ordered levels. The user interface will not allow users to rate their preferences for the levels of these attributes in a way that violates the natural order.

For each question type, the answer may take various forms, along with the form of the likelihood function and parameters describing the likelihood function generated from the set of measured consumer values. For example, the question type, "How will you use this product?", may have an answer that includes ratings along several usage dimensions. The form of the likelihood function associated with this question may be a linear regression between attribute values and usage ratings, with regression coefficients and variance of regression fits characterizing the measured consumer values. Another example is the question, "What is the desirability of each level of this attribute?", with desirability ratings for each attribute level. The form of the likelihood function would be the difference of values between attribute levels and a base level that is proportional to rating differences. The parameters associated with the likelihood function may include the mean and variance of measured value differences between attribute levels based on the measured consumer values. In this case each user's values for the levels of an attribute may be characterized as the amount that the person would be willing to pay to have each of the levels over a base level of the attribute. For example, if the base level of drive type is front-wheel drive, then a user's values for drive type may be represented by three willingness to pay (WTP) values, such as a WTP for rear-wheel drive instead of front-wheel drive, a WTP for four-wheel drive instead of front-wheel drive, and a WTP for all-wheel drive rather than front-wheel drive. The WTPs for a product type may be configured as a 1×n vector, with the index n representing each attribute-level combination for the product type.

Another example is the question, "What is the relative importance of each of these attributes?", with answers indicating the importance ratings of each attribute. The form of the likelihood function may be proportional to the value difference between weighted combinations of attribute levels for two attributes, with required parameters including mean and variance of measured differences between pairs of attribute's weighted level values. Another example is the question, "Which of these products best represents the kind of product you are looking for?", with a specified product being a suitable answer. The form of the likelihood function may be the value difference of the product's level of an attribute with a weighted combination of attribute levels equal to a constant, with required parameters including mean and variance of measured differences between a preferred level of an attribute and its other levels. Another example is the question, "Which of these two products would you prefer, and by how much?", with a suitable answer being a desirability rating between the two products. The form of the likelihood function would be the value difference between the two products and proportional to the rating, with the required parameters being a mean vector and covariance matrix of the value of each attribute-level over its base level. Each likelihood form may use one or more parameters from the database of consumer values.

As a result of optimization analyses with survey data, the performance of the recommendation engine may be further improved by making some adjustments to user ratings before submitting them to the calculations outlined above. These adjustments may be used to compensate for the intrinsic assumptions of homogeneity and linearity in the scales used to rate attribute level preferences. One example of an adjustment may be referred to as an end-scale offset, where a "very undesirable" rating represents a stronger negative opinion than characterized by a simple linear scale. In this example, the rating may be adjusted with a further negative offset. Another example of an adjustment is a level preference multiplier. Although the same rating scale may be used to rate the levels of the attributes, users may not use the scale the same way with each attribute. The performance of the recommendation engine may be improved by scaling the ratings for some attributes. In this example, a constant multiplier may multiply the level preference ratings of the attribute.

A mean vector and a precision matrix for the consumer values may be calculated for each question-answer combination, as seen at block 325. The updating process may be repeated for each question, so that in the end a posterior precision matrix and a posterior mean vector that encompass the updating process for all the questions and the prior Gpdf is calculated, as seen at block 330. The posterior mean vector may be used as the best estimate of the user's attribute values for the final stage in the process, and the total values for a set of product models in the product definition database are calculated, as seen at block 335. Detailed information regarding the products such as price, options, attribute levels, and features may be received from the product definition database, as seen at block 340.

The product definition database contains the attribute levels for each product. Using the best estimate of the user's attribute values, the contribution of each attribute to the total value of each product may be calculated, as seen at block 335. The values assigned to each attribute may be summed to obtain a total value of each product.

The total values may be sorted, and a set of product recommendations may be made based on the sorted total values, as seen at block 345. The recommendations may be listed or displayed on the user's screen, as seen at block 350. The user may change the answer to a question, answer additional questions, change preference selections, or request additional recommendations, as seen back at block 310.

In many situations, the list of products includes multiple instances of each model, one instance for each option. For example, if the product area is mobile vehicles, each vehicle model may have several options on the market corresponding to different power trains and trim levels. The total value for all the options associated with each model are compared and the option with the highest value for each model becomes the representative for the model for the purposes of calculating recommended products. The top models, for example, the top ten or the top five models with their associated best options may be shown to the user as the recommended products for his or her consideration.

Notice that if a user goes back and changes an answer to one or more questions, it is easy to update the user's Gpdf. Rather than repeat the process for all the questions, it is simpler to replace the precision matrices and mean vectors for just those questions whose answers have been changed, thus speeding up the process of recalculating the recommended products.

Figure 4:
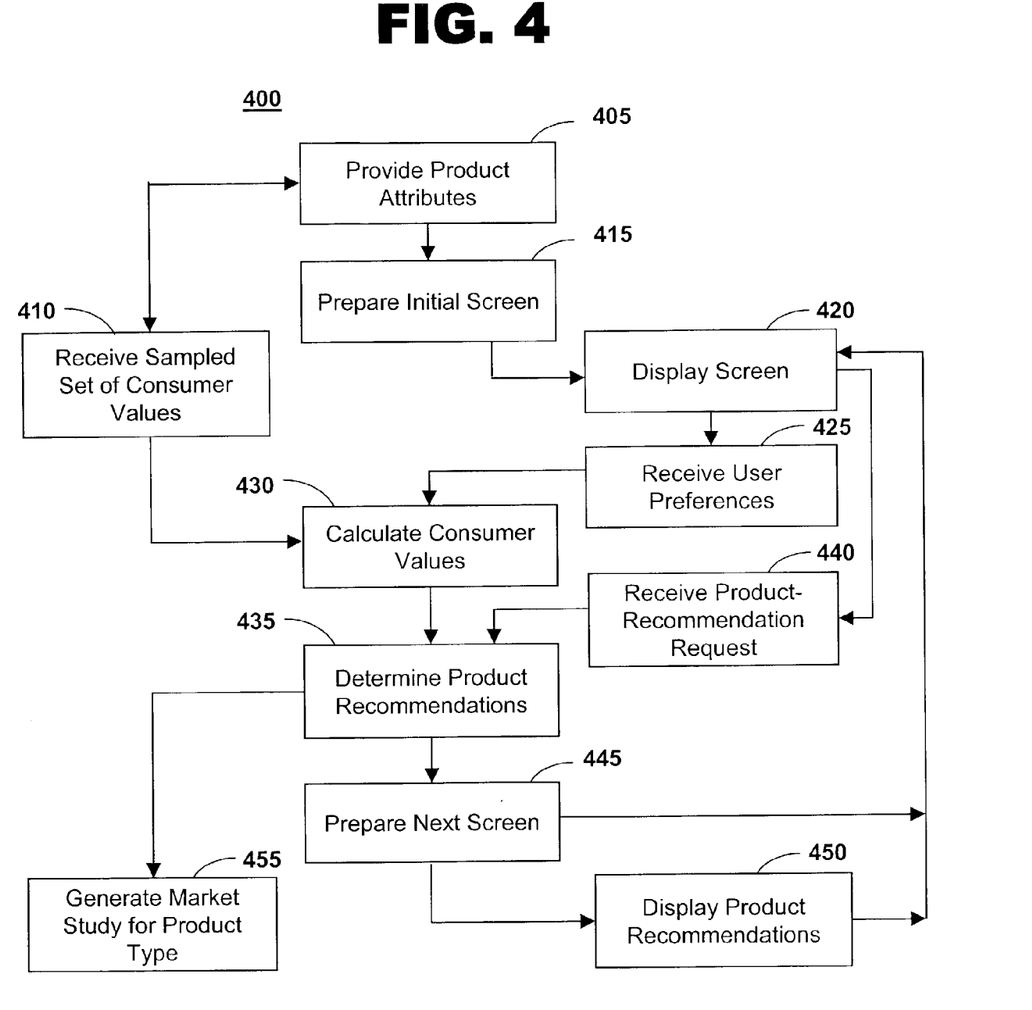
FIG. 4 is a flow chart of yet another embodiment of a method for generating a product recommendation, in accordance with the current invention.

FIG. 4 illustrates another embodiment of a method for generating a product recommendation for a product type, in accordance with the present invention at 400. Product-recommendation method 400 begins with providing a plurality of product attributes associated with the product type, as seen at block 405. The product attributes may include at least one attribute level associated with each product attribute. The product attributes may correspond to a sampled set of consumer values for a specific type of product, such as mobile vehicles, consumer goods or consumer services. The sampled set of consumer values may be received from a study of consumer values, as seen at block 410. The sampled set of consumer values may be generated by formal and informal methods such as interviews and questionnaires to determine values that each sampled consumer may place on a given product, feature, attribute, or option, and may include a set of measured product attribute values from a set of respondents or consumers. An initial screen may be prepared for a user of the recommendation engine, as seen at block 415. The screen may be sent to the user, for example, over the web and displayed on the user's terminal, as seen at block 420. The user selects preferences or chooses to answer one or more questions regarding his or her preferences for the product. The user preferences are received, as seen at block 425. The user preferences may be received via the web interface. The user preferences corresponding to the product attributes are combined with the sampled set of consumer values to calculate a plurality of consumer values, as seen at block 430. The consumer value calculation may include determining a likelihood function based on the at least one user preference, calculating an initial Gpdf based on the sampled set of consumer values, calculating a posterior Gpdf based on the likelihood function and the initial Gpdf, and calculating a consumer value based on the posterior Gpdf. A linear form and an additive Gaussian noise function may characterize the likelihood function with a variance based on the sampled set of consumer values. A mean vector and a precision matrix may characterize the initial and posterior Gpdfs.

A set of product recommendations may be determined based on the calculated consumer values, as seen at block 435. One or more product recommendations may be determined by computing a total value for each of a set of products in a product definition database, sorting the total values to produce an ordered list of total values, and associating a product in the product-definition database with the ordered list of total values.

The user may request to see the product recommendations during a user session. A product-recommendation request may be received, as seen at block 440. The next screen may be prepared, which may include information and photos regarding the recommended products, as seen at block 445. The product recommendations may be displayed based on the product-recommendation request and the calculated consumer values, as seen at block 450. In another embodiment, the recommendations may be displayed promptly after the consumer values have been calculated without requiring a product-recommendation request. If the user wishes to refine his/her preferences or change answers to questions after product recommendations are made, the user may do so, after which new recommendations may be generated.

The calculated consumer values may be used to generate a market analysis or study regarding the product type, as seen at block 455. The study may be based on a single set of recommendations, or aggregated from the results of many different user sessions.

One or more aspects of the method for generating a product recommendation may be coded using any suitable programming language. A program containing the computer program code may be stored on any computer usable medium such as a compact disc (CD), digital versatile disc (DVD), magnetic disc, magnetic tape or any other suitable computer-readable medium.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of generating a product recommendation for a product type, using a product recommendation engine including an application server, at least one graphical user interface, and a user computer, as well as a measured consumer values database, a product definition database, and a user database, the method comprising said customer computer performing the steps of:

receiving at the user interface a user selection of a product type;

retrieving from the product definition database a plurality of product attributes associated with the product type;

receiving a sampled set of consumer values from the measured consumer values database;

receiving at least one user preference corresponding to the product attributes from at least one of the user interface and the user database;

calculating a plurality of consumer values based on the at least one user preference and the sampled set of consumer values by determining a likelihood function based on the at least one user preference, calculating an initial Gaussian probability density function based on the sampled set of consumer values, calculating a posterior Gaussian probability density function based on the likelihood function and the initial Gaussian probability density function, and calculating a plurality of consumer values based on the posterior Gaussian probability density function;

determining at least one product recommendation based on the calculated consumer values; and providing the at least one product recommendation to the user via the user interface.

2. The method of claim 1 wherein the product type comprises mobile vehicles.

3. The method of claim 1 wherein the product type is selected from the group consisting of digital cameras, personal computers, personal digital assistants, computer printers, cell phones, televisions, cameras, entertainment systems, power tools, MP3 players, DVD players, consumer electronic products, consumer appliances, consumer goods, consumer services, office equipment, business software, credit cards, home mortgages, car loans, health insurance, restaurants, telephone services, hotel rooms, airplane tickets, vacation packages, a consumer-valued product, and a consumer-valued service.

4. The method of claim 1 wherein the plurality of product attributes includes at least one attribute level associated with each product attribute.

5. The method of claim 1 wherein the user preference is received via a web interface.

6. The method of claim 1 wherein the likelihood function is characterized by a linear form and an additive Gaussian noise function with a variance based on the sampled set of consumer values.

7. The method of claim 1 wherein the posterior Gaussian probability density function is characterized by a mean vector and a precision matrix.

8. The method of claim 1 wherein determining at least one product recommendation comprises computing a total value for each of a set of products in a product-definition database, sorting the total values to produce an ordered list of total values, and associating a product in the product-definition database with the ordered list of total values.

9. The method of claim 1 further comprising:

displaying the last least one product recommendation based on the calculated consumer values.

10. The method of claim 1 further comprising:

generating a product type market study based on the plurality of calculated consumer values.

11. A non-transitory computer usable medium including a program to generate a product recommendation for a product type, comprising:

computer program code to providing a plurality of product attributes associated with the product type;

computer program code to receive a sampled set of consumer values;

computer program code to received at least one user preference corresponding to the product attributes;

computer program code to calculate a plurality of consumer values based on the at least one user preference and the sampled set of consumer value by determining a likelihood function based on the at least one user preference, calculating an initial Gaussian probability density function based on the sampled set of consumer values, calculating a posterior Gaussian probability density function based on the likelihood function and the initial Gaussian probability density function, and calculating a plurality of consumer values based on the posterior Gaussian probability density function; and computer program code to determine at least one product recommendation based on the calculated consumer values.

12. The computer usable medium of claim 11, further comprising:

computer program code to display the at least one product recommendation based on the calculated consumer values.

13. The computer usable medium of claim 11, further comprising:

computer program code to receive a product-recommendation request; and computer program code to display the at least one product recommendation based on the product-recommendation request and the calculated consumer values.

14. The computer usable medium of claim 11, further comprising:

computer program code to generate a product type market study based on the plurality of calculated consumer values.

* * * * *